3,069,468
DIAMINO TRICYCLODECANE

Eugene F. Cox, South Charleston, David T. Manning, Charleston, and Harry A. Stansbury, Jr., South Charleston, W. Va., assignors to Union Carbide Corporation, a corporation of New York
No Drawing. Filed Mar. 16, 1959, Ser. No. 799,409
1 Claim. (Cl. 260—563)

This invention relates to certain novel tricyclodecanes and to a process for their preparation. More particularly, the present invention relates to 3,10-diaminotricyclo[5.2.1.0$^{2,6}$]decane and its functional derivative, 3,10-diisocyanatotricyclo[5.2.1.0$^{2,6}$]decane.

The novel materials of the present invention may be represented by the following general formula:

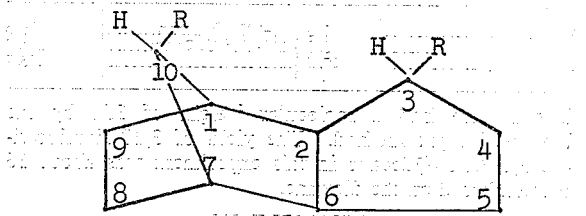

wherein R is selected from the class consisting of —NH$_2$ and —N=C=O.

The novel 3,10-diaminotricyclo[5.2.1.0$^{2,6}$]decane of the present invention can be condensed with dibasic acids to form valuable and useful polyamide resins.

The novel diisocyanate of the present invention, 3,10-diisocyanatotricyclo[5.2.1.0$^{2,6}$]decane is useful as a monomer in the production of nonyellowing polyurethane resins.

3,10-diaminotricyclo[5.2.1.0$^{2,6}$]decane can be prepared by the hydrogenation of 1,8-dioximino-4,7-methano-3a,4,7,7a-tetrahydroindene. The indene used in the hydrogenation is a known compound which can be prepared from cyclopentadiene, nitrosyl chloride, and sodium ethoxide by the methods described in copending application Serial No. 783,701. The hydrogenation reaction should be conducted in the presence of from 1 to 250 mols, per mol of dioxime, of anhydrous ammonia and preferably is conducted using from about 5 to about 50 mols of anhydrous ammonia per mol of dioxime. The hydrogenation may be conducted at a temperature of from about 0 to about 250° C. but is preferably conducted at a temperature of from about 25 to about 200° C. and at a pressure of from about 100 to 4000 p.s.i.g., preferably from about 1000 to about 2000 p.s.i.g. A hydrogenation catalyst should preferably be employed. Suitable hydrogenation catalysts include Raney nickel, cobalt, platinum, palladium, and the like. The catalyst should be present in an amount corresponding to from about 5 to about 100 weight per mol of dioxime. While not essential to the reaction, an inert solvent, such as methanol, p-dioxane, ethanol, or diethylene glycol diethyl ether may be employed in an amount corresponding to from about 2 to about 50 parts by weight per part of dioxime.

3,10-diisocyanatotricyclo[5.2.1.0$^{2,6}$]decane can be prepared by reacting 3,10-diaminotricyclo[5.2.1.0$^{2,6}$]decane with phosgene. The phosgene should be employed in an amount corresponding to from about 2 to 200 mols per mol of the decane. The reaction should be conducted at a temperature of from about 50 to about 350° C., preferably from about 100 to about 300° C. and should be conducted in the presence of inert solvents such as benzene, toluene, chlorobenzene, dichlorobenzene, trichlorobenzene, chlorinated toluene, chlorinated xylenes, chlorinated naphthalenes, sulfolanes, and tetrahydronaphthalene.

The following example is illustrative of the preparation of the dioximino compound employed in the present invention:

EXAMPLE I

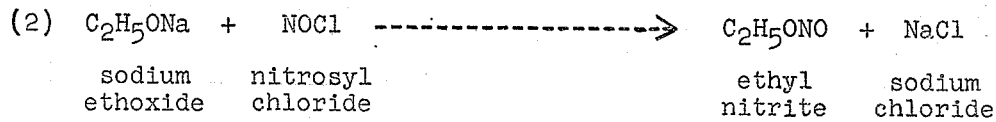

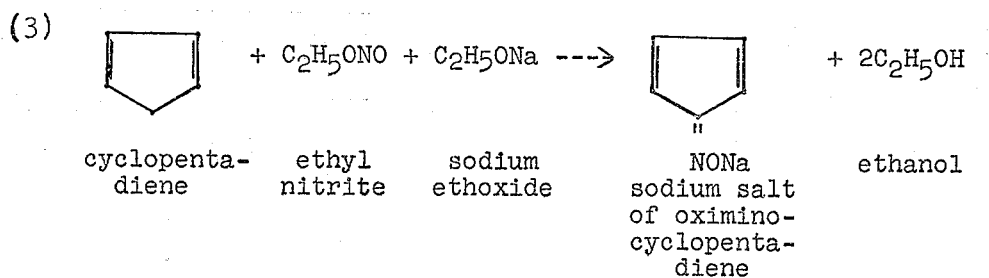

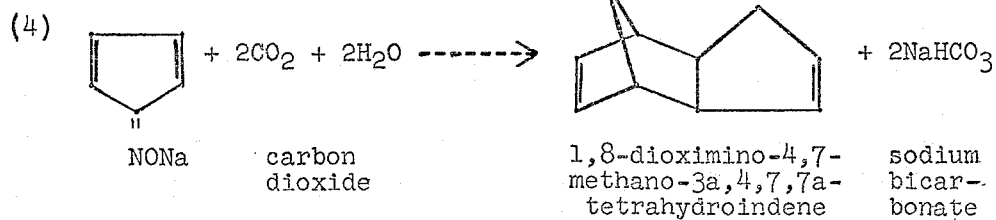

Anhydrous ethanol (3000 ml.) was stirred and refluxed, while 69 grams of sodium metal (3 moles) were dissolved. The resulting solution of sodium ethoxide was stirred at 10 to 15° C. while 94 grams of nitrosyl chloride (72 ml. at −30° C., 1.56 moles) were fed over a period of 20 minutes. The mixture was stirred at 2 to 7° C. while 94.5 grams of freshly distilled cyclopentadiene (1.43 moles) were fed over a period of 2 hours. After a reaction period of 2 hours at 7 to 22° C., the reaction mixture was added to 1500 ml. of cold water (5° C.) and stripped to a kettle temperature of 25° C. at 10 mm. to remove ethanol. The residue was extracted several times with ethyl ether to remove base-insoluble impurities. The basic aqueous solution (pH 12) was saturated with carbon dioxide at 8° C. to reduce the pH to 7.8 and precipitate the crude dioxime. Both the precipitate and the aqueous layer were extracted continuously with ethyl ether to separate the dioxime from tarry by-products. Evaporation of the ether from the extract yielded 87.5 grams (64 percent yield) of dioxime as a light tan solid in several crops melting in the range of 155 to 162° C. An analytical sample was prepared by dissolving 20 grams of the dioxime in 100 ml. of 2 N sodium hydroxide plus 50 ml. of water. After filtration, the solution was neutralized with carbon dioxide and extracted with ethyl ether several times. The extracts were combined and the ether evaporated to obtain 17.2 grams of pure dioxime of melting point 160 to 164° C. Found 63.0 percent C (theory 63.14 percent), 5.9 percent H (theory 5.3 percent), 14.3 percent N (theory 14.7 percent). The infrared absorption spectrum supported the assigned structure.

The following examples are illustrative of the present invention:

EXAMPLE II

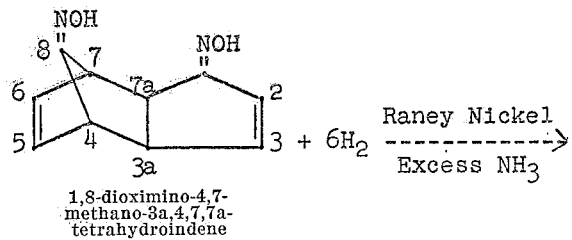

1,8-dioximino-4,7-methano-3a,4,7,7a-tetrahydroindene

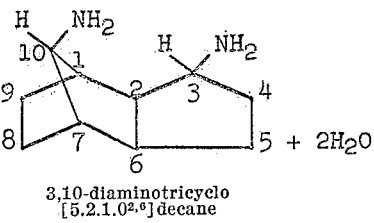

3,10-diaminotricyclo[5.2.1.0$^{2,6}$]decane

A mixture of 64.3 grams (0.338 mole) of 1,8-dioximino - 4,7 - methano - 3a,4,7,7a - tetrahydroindene, 250 grams of Raney nickel catalyst, and 1500 ml. of ethanol was divided equally between two 3-liter stainless steel rocker autoclaves. To each autoclave was then added 689 grams of anhydrous ammonia (40.5 moles). Thus the molar ratio of ammonia to dioxime was 240/1. Each charge was then hydrogenated at 1000 to 1600 p.s.i.g. to a maximum temperature of 90° C. The hydrogen absorption appeared to be complete after two hours at 27° C., but the temperature was gradually increased to 90° C. over a period of six hours to ensure complete hydrogenation. The hydrogenated mixtures were combined, filtered to remove catalyst, and distilled to isolate 41 grams of 3,10-diaminotricyclo[5.2.1.0$^{2,6}$]decane as a colorless liquid having these properties: boiling range 87 to 98° C./0.5 mm., 84.2 equivalent weight as amine by titration with perchloric acid. Since the theoretical equivalent weight for the diamine is 83, the purity was 98.6 percent. The yield was 72 percent based on the dioxime. The distillation residue weighed only 4.8 grams and the ratio of distilled product to residue was 8.5.

EXAMPLE III

A mixture of 51.8 grams (0.273 mole) of 1,8-dioximino-4,7-methano-3a,4,7,7a-tetrahydroindene, 300 ml. of ethanol, and 40 grams of Raney nickel catalyst was hydrogenated at 2000 to 3500 p.s.i.g. and at 110 to 150° C. for 7.5 hours. The hydrogenated mixture, which contained ammonia, was filtered and distilled to obtain the fractions listed in Table I below.

TABLE I

| Fraction | Weight grams | Distillation range | Equivalent weight as amine |
|---|---|---|---|
| 1 | 5.8 | 96–100° C./1 mm | 96.5 |
| 2 | 8.0 | 110–125° C./2 mm | 101.0 |
| Residue | 27.2 | | 126.7 |

The residue had a molecular weight of 351 by the Menzies-Wright method. The yield of 3,10-diaminotricyclo[5.2.1.0$^{2,6}$]decane in this experiment was about 16 percent based on the dioxime.

EXAMPLE IV

A mixture of 51.8 grams (0.273 mole) of 1,8-dioximino-4,7-methano-3a,4,7,7a-tetrahydroindene, 300 ml. of ethanol, 40 grams of Raney nickel, and 10 grams of anhydrous ammonia (.59 moles, molar ratio ammonia to dioxime of 2.2) was hydrogenated at 500 p.s.i.g. while heating gradually to 100° C. over a period of 5 hours. The filtered mixture was distilled to obtain the fractions listed below in Table II.

TABLE II

| Fraction | Weight, grams | Distillation range | Equivalent weight as amine |
|---|---|---|---|
| 1 | 15.7 | 83–98° C./.5 mm | 86.8 |
| 2 | 7.4 | 98–130° C./.5 mm | 93.4 |
| Residue | 18.0 | | 121.8 |

The yield of 3,10-diaminotricyclo[5.2.1.0$^{2,6}$]decane was about 43 percent based on the dioxime.

EXAMPLE V

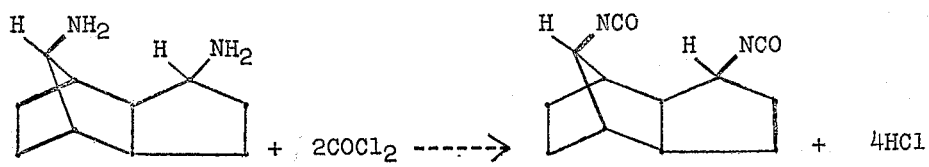

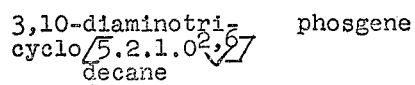

3,10-diaminotricyclo[5.2.1.0$^{2,6}$]decane    phosgene

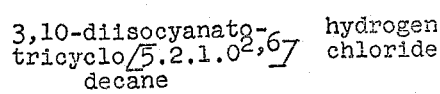

3,10-diisocyanatotricyclo[5.2.1.0$^{2,6}$]decane    hydrogen chloride

A solution of 3,10-diaminotricyclo[5.2.1.0$^{2,6}$]decane (33.3 grams, 0.20 mole) in 300 ml. of o-dichlorobenzene was stirred at 90 to 95° C. while carbon dioxide bubbled in for 22 hours. The resulting slurry was cooled to 0–5° C., and 90 grams of phosgene were added dropwise with stirring during one hour. More phosgene (36 grams) was added while the slurry was allowed to warm to room temperature. The slurry was heated to 160° C. and phosgene addition continued at an approximate rate of 25 grams per hour for ten hours. After purging with nitrogen and removal of solvent under reduced pressure, 39 grams of 3,10-diisocyanatotricyclo[5.2.1.0$^{2,6}$]decane were distilled, boiling point 130 to 134° C./.5 mm. The yield was 90 percent based on the diamine.

*Analysis.*—Calculated for $C_{12}H_{14}N_2O_2$: C, 66.02; H, 6.47; N, 12.84. Found: C, 66.10; H, 6.67; N, 12.48.

EXAMPLE VI

*Polyurethane Foam Prepared From 3,10-Diisocyanatotricyclo[5.2.1.0$^{2,6}$]Decane*

Ten grams of a polyester of adipic acid and diethylene glycol, 4.4 grams of 3,10-diisocyanatotricyclo-[5.2.1.0$^{2,6}$]decane, and 0.3 gram of emulsifier comprising a nonionic fatty amido condensate were thoroughly mixed in a beaker. Dibutyltin acetate catalyst (0.15 gram) was added and mixing continued until the temperature of the mixture rose to 35° C. Water (0.20 gram) was then added and rapidly stirred into the mixture. Foaming occurred after a four-minute exposure in an oven at 80° C.

Unless otherwise indicated, as used throughout this specification, all parts and percentages are by weight.

What is claimed is:

3,10-diaminotricyclo[5.2.1.0$^{2,6}$]decane.

References Cited in the file of this patent

UNITED STATES PATENTS

| | | |
|---|---|---|
| 2,822,373 | Beck | Feb. 4, 1958 |
| 2,850,532 | Simon et al. | Sept. 2, 1958 |
| 2,864,863 | Young | Dec. 16, 1958 |
| 2,875,226 | Bloom et al. | Feb. 24, 1959 |

OTHER REFERENCES

Prelog et al.: Ber. Deut. Chem., vol. 74, pages 1769–1772 (1941).

Elsevier: Elsevier's Encyclopedia of Organic Chemistry, vol. 12A, page 160 (1948).

Reppe et al.: Ann. der. Chemie, vol. 560, pages 1–92 (1948).

Wilder et al.: J.A.C.S., vol. 81, pages 655–658 (1959).
(Copies of above in Patent Office Sci. Lib.)